C. D. GRATON.
NEGOTIABLE PAPER.
APPLICATION FILED SEPT. 23, 1919.
1,378,673.
Patented May 17, 1921.
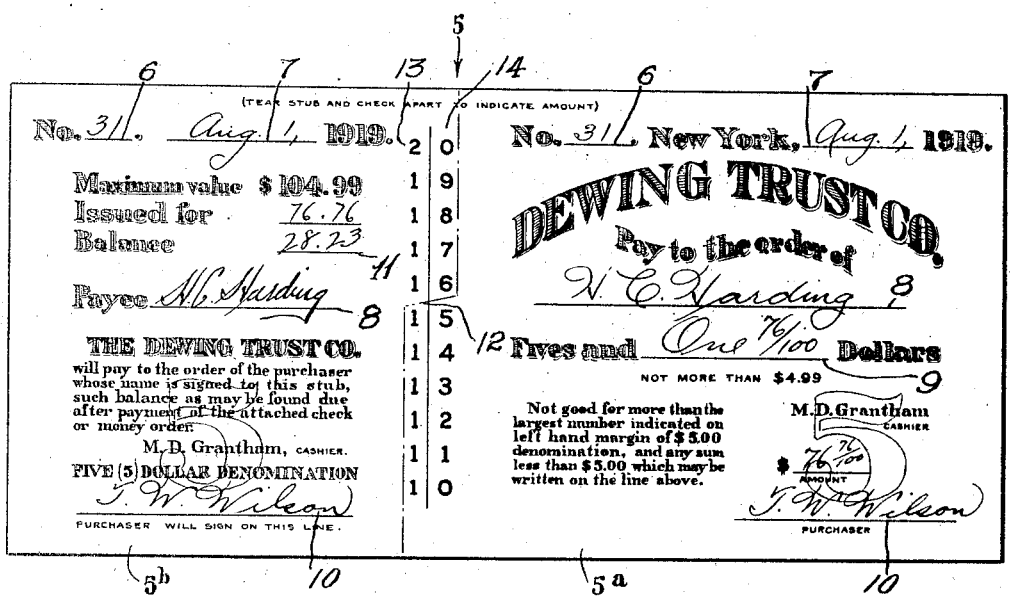
WITNESSES
INVENTOR
Claude D. Graton
BY
ATTORNEYS

UNITED STATES PATENT OFFICE.

CLAUDE D. GRATON, OF NEWARK, NEW JERSEY.

NEGOTIABLE PAPER.

1,378,673.                 Specification of Letters Patent.      Patented May 17, 1921.

Application filed September 23, 1919. Serial No. 325,627.

*To all whom it may concern:*

Be it known that I, CLAUDE D. GRATON, a citizen of the United States, and a resident of Newark, in the county of Essex and State of New Jersey, have invented a new and Improved Negotiable Paper, of which the following is a full, clear, and exact description.

This invention relates to negotiable papers, especially checks, drafts, money orders, and the like which are used for transacting money considerations between two or more parties.

For convenience in describing the advantages and manner of putting the invention into practice it will be hereinafter referred to as a check. However, its use should in no way be considered limited to the usual method of using ordinary checks as its novelty may find expression in many transactions where a conventional form of check would not suffice.

One object of the invention is to provide a check which is to safe-guard the payor against fraudulent methods being carried out to raise or increase the amount originally provided for by the payor.

Another object is to provide a check which has a wider range of use than the ordinary checks which are made out for a given amount, for instance in the case of travelers' checks where it is common to issue the check for a given amount, it is not always convenient to use such a check in a purchase where the amount of the purchase is less than the amount of the check. Under these conditions a transaction must be made which will necessitate the one offering the purchase making change to re-imburse the purchaser for the unexpended amount of the check. According to the present invention a purchase may be made without regard to making change in that the check may be made out for the exact amount.

Still another object of the invention is to provide a negotiable paper, such as described, which will embody all the features for proper identification and in this manner protect the payor from losses incurred through fraudulent methods which may be employed by some one to realize financially on a blank check, which by error would fall into his hands.

A still further object of the invention is to provide a check which will answer each and every purpose of an ordinary check and at the same time provide a stub which is substantially identical with the check in so far as its negotiable value is concerned and in this manner overcome the disadvantage of carrying a number of checks having only a single given value.

The accompanying drawing illustrates the preferred arrangement of the check, at the same time giving an example how the check may be used in actual practice.

While many changes in detail may be resorted to without departing from the spirit of the invention the arrangement shown in the drawing is more than likely the best method of illustrating the advantages of the idea. Accordingly the check consists of a sheet of paper 5 preferably manufactured from durable bank note paper material, and as is the case in many instances the surface of the sheet may be printed with various designs to prevent any part of the instructive printing or writing being altered. The sheet is adapted to be divided into two parts of which part $5^a$ has the characteristic qualities of a check, the adjoining part $5^b$ having the characteristics of a stub. Both the check and the stub are substantially identical in that they both appear with the name of the issuing concern, for instance " Dewing Trust Co." having a blank space for the number 6, the city in which the issuing concern is established, a blank space 7 for the date, the usual " Pay to the order of " request, a blank line 8 for the payee's name, a blank space 9 for the insertion of the amount of the check and the other descriptive printing which is essential in using the check, and a blank space 10 for the payor's signature. In the present instance the payor's signature appearing on both the check and the stub, together with other descriptive writing and printing will serve as a medium of proper identification. The cashier's name, M. D. Grantham, is preferably printed on both the stub and check though if desired, it could be left blank and inserted by the cashier himself.

As an example for using the check "T. W. Wilson" will be represented as having purchased from the "Dewing Trust Co." a negotiable check paying $104.99 for the same, which amount will represent the maximum value of the check. This purchaser having an occasion to pay to a third party a certain amount, for instance $76.76, he will therefore write the name of the payee on both the check 5ª and the stub 5ᵇ, and in the case of the particular denomination of the present illustration the numeral column between the check and the stub is resorted to to indicate the largest number of the denominations of the check which will total approximately $76.76. Inasmuch as the check shown is for a five dollar denomination the number fifteen will be selected from the numerals, which when multiplied by five will amount to $75.00, the addition of $1.76 will be filled in in the space 9 provided for this purpose adjacent the word representing the particular denomination. When this is done the amount of the check, namely $76.76 will be written on the stub immediately beneath the amount representing the maximum value of the check and subtracted from this amount with the balance written on the line 11 provided for this purpose. Both the payee's name and the purchaser's name will be written on the stub as on the check. The purchaser having signed the stub at the time of purchase, his signature will serve to identify him to the satisfaction of the one accepting the check; then too, it serves another purpose in assisting the banking institution which stands back of the maximum amount, if and when properly issued by the purchaser, in the identification of the stub by means of the signature. It helps the paying banking institution to identify the stub 5ᵇ and that portion of the check referred to as 5ª. The check and stub are then separated as indicated on the dotted line 12 shown adjacent the numeral columns. Care should be taken that the check and stub be separated to leave the number representing the largest number of single denominations as the greatest number on the check. As fifteen will be used in the example shown the number fifteen will appear as the greatest number on the check, likewise the number sixteen will appear as the lowest number on the stub, verifying the number 15 being the greatest number on the check. In the case of the balance of $28.23 the payor or purchaser may deposit the stub in the bank or indorse it to still another party, or cash the same to realize on the balance. In case the payor desires to use the stub 5ᵇ as a check he will merely indorse the same on the back with his name and a statement above his name to the effect that the balance on the face of the stub is to be paid to a certain party. If the payor desires to deposit the stub in the bank to his credit or to cash the stub, he merely indorses the stub on the back and receives the proper credit in the same manner as if depositing or cashing an ordinary check. The name, H. C. Harding on the stub is of no consequence except to indicate that a party by this name has received the sum of $76.76 through the use of the check which has been torn from the stub.

As previously stated the five denomination of the check shown is merely for illustration, checks may be used for any denomination corresponding to the paper money of the United States. Checks of other denominations are used substantially in the same manner except that the numeral columns, while appearing the same are selectively used as the case may be. As an example if one of the checks were purchased for $20.99, the maximum upon a one dollar denomination, and the purchaser wished to pay $4.57, the check may be made out for this amount and the stub and check would be separated to leave the number four as the last or greatest number on the check and the balance could be realized by cashing the stub as previously explained. In writing the check for from 1–9, both inclusive, of any denomination for which the check may be issued, the check and stub should be separated between the numeral columns 13 and 14.

As a comparison between the check contemplated by the present invention and the conventional types of so-called traveler's check that is, the conventional type of traveler's check using the ten dollar denomination as an example, the check is good for only this amount, whereas in the present case instead of having a ten dollar denomination for this amount only, the check would provide $209.99 as its maximum and any part of that amount as its minimum.

Having thus described my invention what I claim as new and desire to secure by Letters Patent is as follows:

1. A negotiable paper comprising a stub section and a check section having two columns of figures positioned at the juncture of said stub section and check section arranged so that adjacent numbers of respective columns are read together before the check is torn from its stub, said check being capable of being torn from the stub so as to leave any number of the combined column of figures on the check section or any single number on the check section, said check section having printed matter thereon directing a certain institution to pay the sum written thereon, a line for said sum, a line for the payee's name and a line for the payor's name, said check having in the printed matter means indicating the denomination of the check which denomination is multiplied by the highest number left on the check from said two columns of figures when the check is torn therefrom, and a line arranged on the stub section for receiving in writing figures indicating the value of said check.

2. A negotiable paper comprising a stub section and a check section, a pair of columns of figures positioned at the juncture of said stub section and said check section, said check section having the usual characteristics of a check with provisions for writing the name of the payee, payor and a sum in addition to the printed value of the check, said stub section being provided with printed matter corresponding with the printed matter on the check section, a printed maximum value, a line for receiving figures indicating the sum for which said check section has been issued and a line for indicating the balance due to the owner of the negotiable paper.

3. A negotiable paper comprising a sheet carrying two columns of figures extending from near the bottom to near the top at a point intermediate the ends of the sheet, said columns of figures dividing the sheet into a check section and a stub section, said check section being provided with printed matter representing the usual printed matter of a check and in addition printed matter indicating the denomination of the check, a line for an additional sum to be written, a line for the payee's name and a line for the payor's name, said stub section being provided with printed matter corresponding with the printed matter on said check section and including a printed maximum value for the check section, a line for receiving numbers indicating the sum for which the check section has been issued and a line for receiving numbers indicating the difference between the maximum value printed on the stub section and the sum for which the check section has been issued, said check section being capable of being torn from the stub section in such a manner as to retain any one or all of the numbers on the vertical column of figures adjacent the check section or any or all of the combined members of said two columns of figures.

CLAUDE D. GRATON.